J. H. REPP.
ADJUSTABLE ROPE CLUTCH.
APPLICATION FILED JUNE 11, 1915.

1,268,621.

Patented June 4, 1918.

Inventor
J. H. Repp.

Witnesses

UNITED STATES PATENT OFFICE.

JOHN H. REPP, OF ALBANY, NEW YORK.

ADJUSTABLE ROPE-CLUTCH.

1,268,621.  Specification of Letters Patent.  Patented June 4, 1918.

Application filed June 11, 1915. Serial No. 33,564.

*To all whom it may concern:*

Be it known that I, JOHN H. REPP, a citizen of the United States, residing at Albany, in the county of Albany and State of New York, have invented certain new and useful Improvements in Adjustable Rope-Clutches; and I do hereby declare the following to be a full, clear, and exact description of the invention, such as will enable others skilled in the art to which it appertains to make and use the same.

This invention is an improved rope clutch which I call the "adjustable never slip clutch" and is especially designed for use for adjusting and securing a tight grip on a small rope or line.

The invention consists in the construction, combination and arrangement of devices hereinafter described and claimed.

In the accompanying drawings:—

Figure 1:
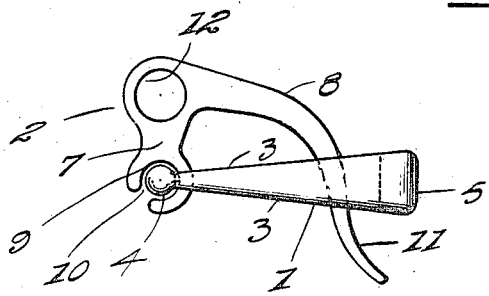
Figure 1 is a side elevation of a rope clutch constructed in accordance with my invention.
Figure 2:
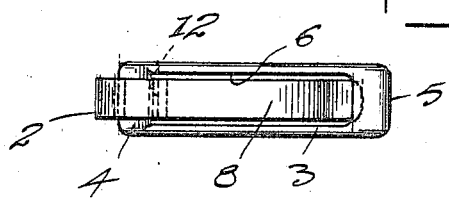
Fig. 2 is a plan of the same.
Figure 3:
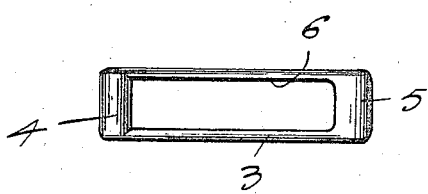
Fig. 3 is a detail plan of the link member.
Figure 4:
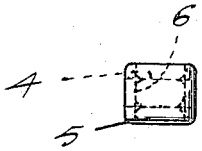
Fig. 4 is a detail end elevation of the same.

My improved clutch comprises a link member 1 and a pivotal member 2. The link member has sides 3 which converge toward one end. A pivotal bar 4 connects the arms or sides of the link members at one end and a bar 5 connects them at the opposite end. The pivotal bar 4 is cylindrical. A slot 6 is formed in the link member between its sides and end bars as shown.

The member 2 comprises angularly related arms 7—8. The arm 7 is shorter than the arm 8 and also broader and is provided in its outer end with a bearing opening 9, adapted to be engaged with the pivotal bar 4 and open at one side as at 10 so that the member 2 may be pivotally connected to the link member 1 and arranged with its arms 8 extending through the slot 6 of said link member. The arm 8 has a substantially S-shaped curved end 11 which projects beyond the opposite side of the link member from the arm 7 when the two members are assembled as shown in Fig. 1.

In use, one end of a small rope or line is fastened in the hole 12 formed in the member 2 and in the angle between its arms 7—8. The other end of the rope or line is drawn through the arms 11 and end 5, thus allowing the member 2 to work on a swivel at 4 and permit the line to be tightened or loosened without tying.

While I have herein shown and described a preferred form of my invention I would have it understood that changes may be made in the form, proportion and construction of the several parts without departing from the spirit of the invention and within the scope of the appended claim.

Having thus described my invention, I claim:—

A rope clutch comprising a link having a pivot bar at one end and a clamping bar at its other end, said clamping bar having angular inner corners and a clamp connected to said pivot bar and having a rope receiving opening and an arm extending through the link in the direction of said clamping bar, the free end of said arm being curved with its concaved side in opposition to one of said angular corners of the clamping bar whereby to effectively clamp a rope between itself and said corners, said rope also engaging said other angular corner of the clamping bar, and said corners biting into said rope to prevent relative movement thereof.

In testimony whereof I affix my signature in presence of two witnesses.

JOHN H. REPP.

Witnesses:
 KATHRYN E. FLAHERTY,
 EDWIN W. SANFORD.

Copies of this patent may be obtained for five cents each, by addressing the "Commissioner of Patents, Washington, D. C."